March 14, 1972  C. W. CHAPMAN ET AL  3,649,416
GUILLOTINE CUTTING MACHINE
Filed July 15, 1969  2 Sheets-Sheet 2

3,649,416
GUILLOTINE CUTTING MACHINE
Charles Walter Chapman, Thornton Heath, Surrey, and Eric Matthews, Whitton, Middlesex, England, assignors to Hallite Holdings Limited, Hampton, England
Filed July 15, 1969, Ser. No. 841,920
Claims priority, application Great Britain, Oct. 23, 1968, 50,402/68
Int. Cl. B26d 5/20; B32b 31/18
U.S. Cl. 156—523                                      10 Claims

ABSTRACT OF THE DISCLOSURE

The guillotine chopping machine carries a roll of rubberised web material having a polythene backing sheet interposed between the layers, the backing sheet is stripped off by rollers as the roll is unwound and the rubberised web is led through power-driven feed rollers to a guillotine arrangement. The leading end of the web is gripped on the far side of the guillotine by a gripping arrangement which can move between the guillotine and a point at a pre-determined distance from the guillotine to draw the web through the guillotine to that predetermined distance, the guillotine then performing a cutting action. The movement of the power-driven feed rollers and gripping arrangement are co-ordinated to impart a firm push-pull action to the web to hold and move it firmly. The sequence of events is carried out successively and automatically, the cut pieces of web being delivered individually for further processing. The machine may be linked with that in which the cut pieces are to be used, so that the two operate in phase.

BACKGROUND OF THE INVENTION

Figure 1:
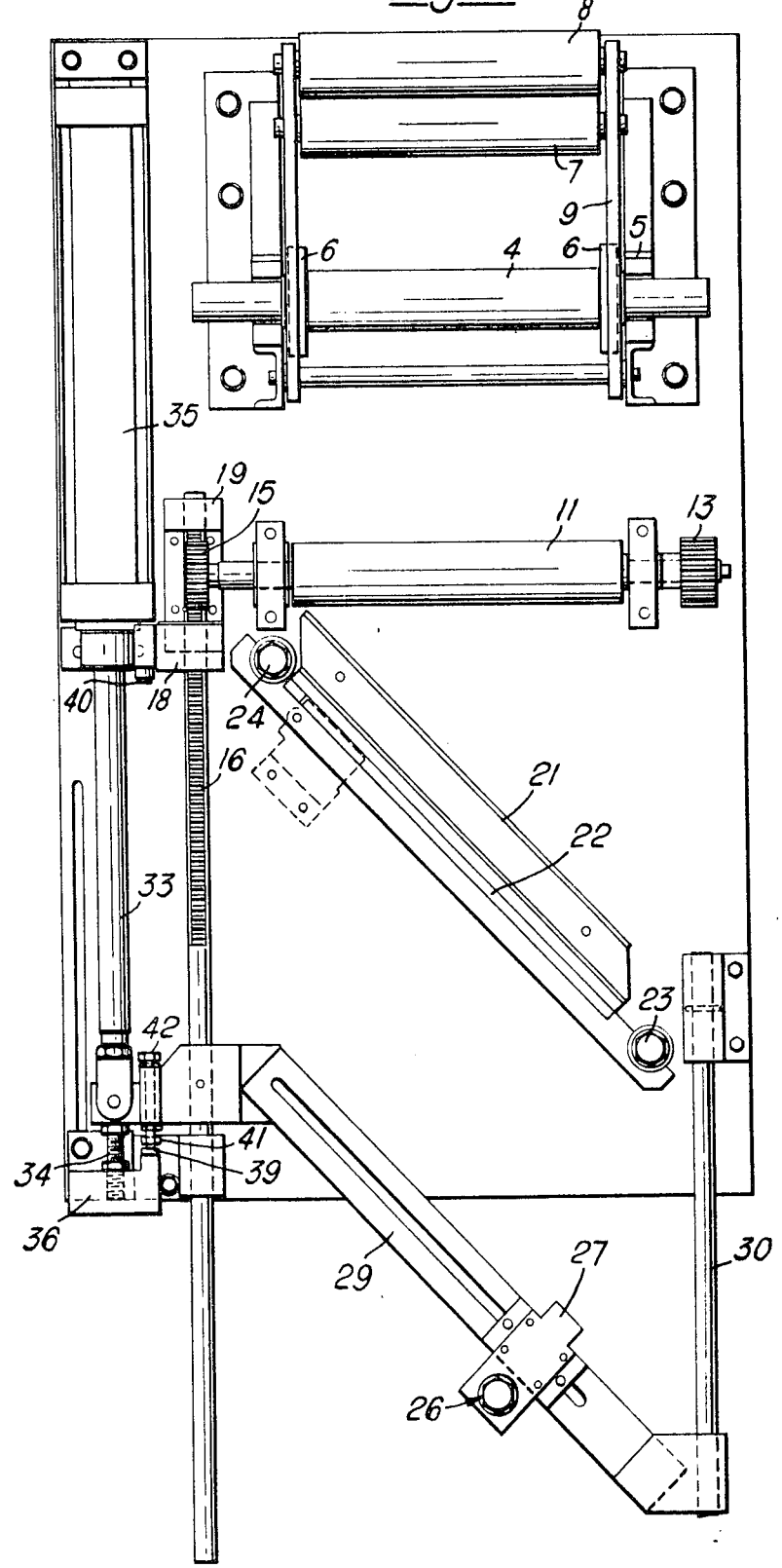

This invention relates to cutting machines of a type which measures and cuts a pre-determined length of web material drawn from a roll. Particular problems occur when the web material is rubberised or other materials which must not be allowed to come into contact with itself because of the tackiness of its surface. Such material is obtainable in rolls with a backing web, e.g. polythene dividing the layers to prevent them from sticking together. This must be stripped from the material before it can be used. In the past, because of the problem of protecting cut lengths, such webs have been cut to length with the backing web still in position. Such protection had to be provided at each tacky face of the material.

SUMMARY OF THE INVENTION

In a guillotine cutting machine which cuts web material into pre-determined lengths, a backing sheet is stripped from a roll of rubberised web material and a push-pull action is imparted to the stripped part of the web to draw it through a guillotine to a pre-determined distance. This action comes from the co-ordinated movement of a pair of power-driven rollers on one side of the cutting edge which push the web and a gripping arrangement at the other side which pull the leading edge of the web.

A machine according to the invention is designed to carry out the two operations of stripping the backing from the rubber material and then cutting off the material to a desired length. Such a machine has means for stripping the backing web from the material, and means for pushing the material towards a guillotine from one side of the guillotine in co-ordination with means for pulling the material through the guillotine from the other side of the guillotine to a pre-determined length, and means operating the guillotine to cut off that pre-determined length. The machine may include an axle arrangement for rotatably supporting a roll of polythene covered sheet rubber material together with a roller arrangement for stripping the polythene covering from the material, a pair of power-driven feed rollers at one side of a guillotine arrangement of two knife edges, which may be set at any desired angle to the pusher rollers so as to cut any desired shape of material, and a gripper arrangement at the other side of the guillotine arrangement mounted level with and parallel to the fixed knife edge but movable along the direction of movement of the material. Control means are provided for the action of the gripper arrangement to be co-ordinated with that of the pusher rollers and, preferably, the guillotine such that the grippers and rollers work together, the former pulling, the latter pushing the material along the same line of action through the open guillotine arrangement until a pre-determined length has passed the knife edge. The movement is then stopped, the movable knife edge is preferably activated by the control means to cut through the material, and lastly the gripper arrangement releases the cut-away length which may then be removed by an operator or presented for further processing.

The push-pull co-ordinated action of rollers and gripper along the same line of action ensures firm and even delivery of the material to the guillotine and also supports the material against its own weight to prevent slackness on the knife edge of the guillotine.

After the cutting off of the length, the co-ordinated sequence of operation is started again, the gripper moving up to the guillotine to take the end of the next length of material as it is pushed through the open guillotine.

The knives of the guillotine arrangement may be mounted so as to give a scissor action when chopping. This is to avoid the wiping of the rubberised material against the side of the knife which would cause it to stick and foul the guillotine as tends to happen if a straight cutting action is used.

The stripping mechanism may include a pair of idle rollers at least one of which bears on the periphery of a roll of material in the machine, and the backing web only being led onto the nip of the rollers. Then, when the roll rotates as material is pulled off it, the idle rollers rotate by virtue of the contact with the roll and thereby draw the backing web through their nip to strip it from the material web.

Figure 3:
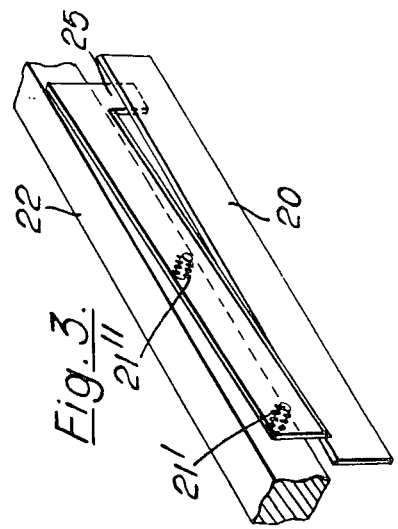
Figure 2:
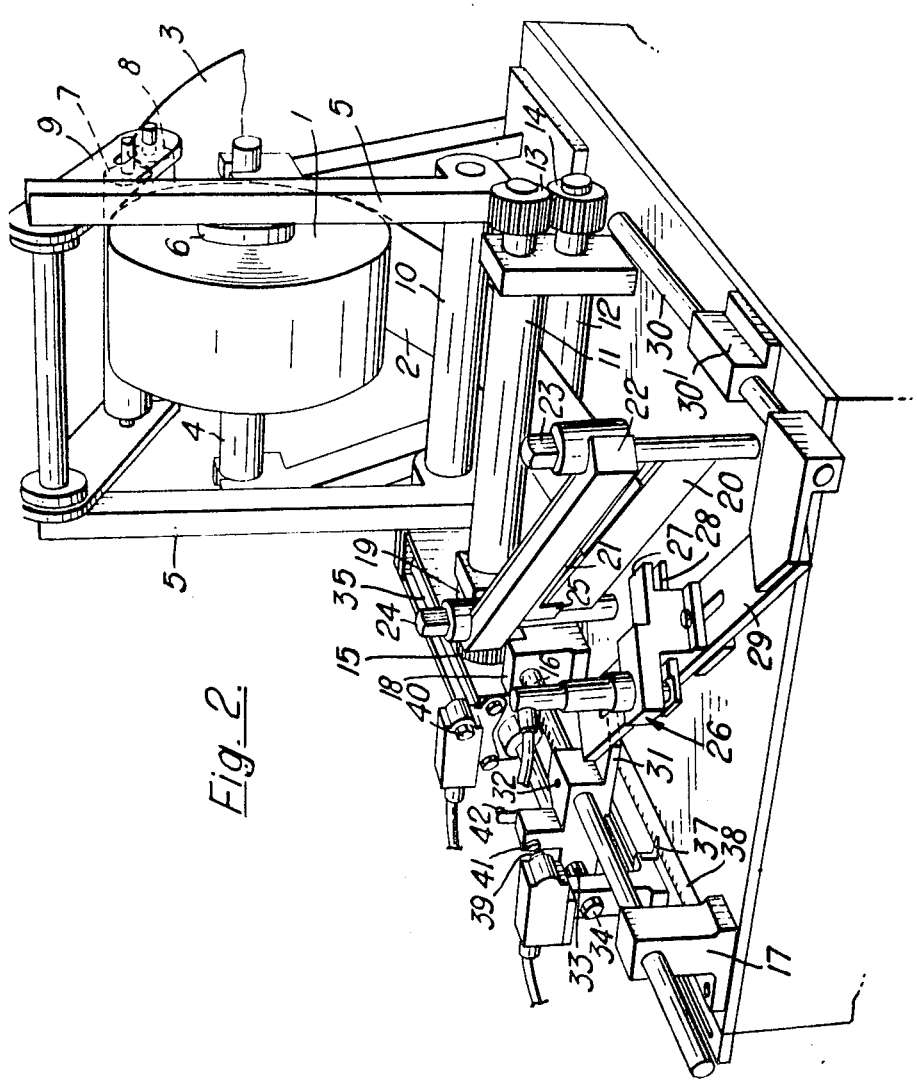

One embodiment of the invention will now be described with reference to the accompanying drawings wherein:
FIG. 1 is a plan view of a machine.
FIG. 2 is a perspective view of a machine, and
FIG. 3 is a perspective view of a detail.

A roll of web material 2 rubberised on each face with a backing web of polythene 3 on one face only to separate the layers in the roll is mounted on an axle 4 rotatably held on a rigid support 5. The roll 1 is restricted in movement along the axle by rings 6 mounted on the axle at either side of the roll which is mounted such that the material unwinds in a downward direction on the side away from the machine. The polythene backing web 3 is stripped from the roll by threading through heavy stripping rollers 7, 8, which are in contact with one another and resting on the periphery of the roll 1. The rollers may be rough surfaced to grip the polythene and are mounted on an arm 9, which is attached to the support 5 at a distance above the axle 4 and which is free to swing so that the rollers may follow the decrease in radius of the roll 1 as the material is used. The rotation of the roll 1 causes, by contact, rotation of the rollers 7, 8, which is sufficient to effect the stripping away of the polythene sheet. Alternatively, the rollers 7, 8, may be power-driven by connection (not shown) to the drive of the other components of the machine.

The end of the rubber material 2 now stripped of its polythene is passed under a guide roller 10, rotatably mounted on the support 5 below the axle 4 and parallel to it. The material 2 is next passed between two power-driven pusher rollers 11, 12, mounted on the working bench parallel to the axle 4, vertically in contact with one another and being geared together at one end by 1:1 gears 13, 14, respectively. At the other end the upper roller 11 has a pinion 15 engaging a rack 16 again in a 1:1 arrangement. That is to say, the peripheral speed of the roller is equal to that of the rack. A one-way clutch or free wheel mechanism communicates drive from the pinion 15 to the roller 11 only in one sense of rotation, corresponding to feed of the material towards the guillotine. The rack 16 can move freely through fixed supporting blocks 17, 18, 19 in an axial direction which is perpendicular to the axes of the rollers 11, 12.

The material 2 now passes between the knives 20, 21, of a guillotine arrangement which may be mounted at any required angle to the longitudinal direction of the web. The knife 20 is stationary in use and the upper knife 21 is supported in a support bar 22 which is fixed parallel to the lower edge 20 and is carried at either end by vertical shafts 23, 24, which may be moved vertically to cause engagement of the knife edges in a chopping action. A projection 25 is rigidly attached to or integral with one end of the upper knife edge 21 and extends in sliding contact over one side of the lower knife edge 20. At the same end the knife 21 is pivoted to the bar 22. Elsewhere it is movably borne on pins 21', and springs 21" urge it away from the bar. The projection 25 guides the upper knife as the knife edges come together against the action of the springs, which hold them tightly together and impart a scissor action to the guillotine.

The leading edge of the material 2 is pulled away from the knife edge 20 by one or more mechanical gripper arrangements 26 (only one being shown) having upper and lower jaws 27, 28, the lower jaw 28 being movable to release the material when required. The gripper is mounted on a bar 29 so that the jaws are parallel to and level with the lower knift edge 20. One end of the bar 29 is attached to a rail 30 which is slidably mounted in a fixed block 30'. The other end is attached to a block 31 to which the rack 16 is secured adjustably. The block 31 and the gripper arrangement is fastened to the rack 16 by a screw 32 so that there is a link between the action of the rollers 11, 12, and the movement of the gripper arrangement 26 on its bar 29, through the movement of the rack 16. The screw 32 enables the position of the gripper arrangement on the rack 16 to be adjusted. The block 31 is also fastened to a sleeve 33 borne on a fixed shaft 34 which is parrallel to and on the far side of the rack 16 from the gripper arrangement, the sleeve being movable in an axial direction parallel to the movement of the rack 16. This sleeve 33 is freely slidable along the fixed shaft 34 and is powerdriven for example by pneumatic or hydraulic pistons in the housing 35, the end of which is adjacent the end of the guillotine arrangement. The fixed shaft 34 is supported at the end away from the housing 35 by a block 36, which is adjustably clamped to a fixed base.

The fixed shaft 34 is of the length defined by the distance between the end of the housing 35 and a pointer 37 at the foot of the clampable block 36, which is given by reading a rule 38 fixed to the base beneath the rack 16. The block 36 and a projection at the end of the housing 35 carries similar electrical switch sensors 39, 40, the distance between them being given by the reading on the rule which is fixed to read zero beneath the contact 40 and a reading indicated by the pointer which is directly beneath the contact 39. Abutments 41, 42, to engage these sensors are mounted on either side of the projection from the block 31 such that when the sleeve 33 is activated it can move a distance defined by the making of contacts 39 with 41 at one end, and 40 with 42 at the other. These are both micro-switch arrangements which control the movement of the sleeve 33. Thus the distance through which the gripper arrangement moves and the associated turning of rollers 11, 12, is controlled by the setting of the block 36, and this defines the length of material to be push-pulled through the guillotine arrangement in one sequence.

The contact made by the micro-switch 39, 40, stops the movement of the sleeve 33 thus halting the rollers 11, 12 and the gripper arrangement 26 and activates the downward movement of the vertical shafts 23, 24, with the knife edge 21 to chop through the material 2. When this downward movement is completed, the jaw 28 is dropped to release the cut-off piece of material 2 which remains however loosely supported in the jaws so that its corner projects so that the operator can easily remove the length of material.

The sleeve 33 is then withdrawn towards the housing 35 causing the gripper arrangement 26 to move up to the guillotine of which the knife edge 21 is raised, the jaw 28 of theg ripper then closes onto the leading edge of the material 2 ready to pull through another length of material when the sleeve 33 is driven out of the housing 35.

All the moving parts of this machine form a compact unit and can be completely covered by a safety shield having only a slit in it through which the corner of the cut length of material is delivered to the operator when the gripper pulls away from the guillotine, there then being no danger that the operator's hand can come near the guillotine while the machine is in operation.

Previously the two operations of stripping the polythene and cutting the rubber material have been performed separately and by hand, and since the length of material was cut into heaps before use, both sides of the rubber material had to be covered with polythene sheet to prevent the cut pieces sticking together. However, when stripping necessarily occurs before cutting as in the machine described and the cut pieces are delivered individually for direct use it is necessary only to provide one layer of polythene per layer of rubber material in order to protect the surfaces of the material from one another, because such protection is needed only while in the roll. This reduces the cost of the polythene sheeting by half as well as having the obvious advantages of avoiding manual handling of the material between the two stages.

This machine has been particularly envisaged for use in conjunction with a known machine which makes cores of rubber sealing rings by rolling up a cut length of rubber sheet material and the two machines may be driven from the same power source and their actions automatically co-ordinated so that the cutting machine delivers a cut length for use as the making-up machine finishes one rolling process and is ready for another.

We claim:

1. A guillotine cutting machine for cutting web material with a backing sheet from a roll, having stripping rollers for removing the backing sheet, feed rollers which are power-driven in one direction for feeding web material stripped of its backing by the stripping rollers, a guillotine acting on a portion of the web stripped by the stripping rollers and a gripping arrangement for gripping a leading edge of the web, the feed rollers being on one side of the guillotine and the gripping arrangement being on the side of the guillotine remote from the feed rollers and being movable between the guillotine and a point at a predetermined distance from the guillotine, movement of the gripping arrangement from the guillotine to the said point being co-ordinated with the power-driven movement of the feed rollers, whereby web material is drivingly held at each side of the guillotine in movement through the guillotine, and means for operating the guillotine to cut a length of stripped web so fed.

2. A guillotine cutting machine according to claim 1 wherein there is a 1:1 rack and pinion gear, and means for driving the rack, the gripping arrangement being fast with the rack, at least one of the feed rollers drivingly connected in a 1:1 ratio for driving in one direction by the pinion, so that when the rack is driven to move the gripping arrangement away from the guillotine to pull the web the feed rollers are caused to rotate to push the web.

3. A guillotine cutting machine according to claim 2 wherein the driving connection is through a free-wheel mechanism associated with the pinion gear.

4. A guillotine cutting machine according to claim 2 wherein the means for driving the rack includes a sleeve slidable along a fixed rod and a fluid-pressure piston and cylinder arrangement, the fixed rod being parallel to the rack, the sleeve being fast with the gripping arrangement and with the piston.

5. A guillotine cutting machine according to claim 1 wherein the gripping arrangement has at least one jaw member and a bear, the bar being parallel to the guillotine, the jaw member being fixed to the bar and adjustable in position along it.

6. A guillotine cutting machine according to claim 5 wherein the guillotine and bar are disposed at an inclination to the direction of movement of the web through the guillotine.

7. A guillotine cutting machine according to claim 5 wherein there are two jaw members spaced apart from one another along the bar.

8. A guillotine cutting machine according to claim 1 wherein a roll of web is borne on the machine, the stripping rollers are idle rollers, and one of the stripping rollers is adapted to run upon the surface of the roll of web and being driven in rotation by rotation of the roll, the backing sheet passing into a nip between the stripping rollers and being drawn off the web by rotation of the said stripping roller on rotation of the roll.

9. In a guillotine machine for cutting sheets from a web of tacky or like material provided with a backing strip, the improvement comprising means in a web path through the machine before the guillotine stripping the backing strip from the web, and means closely before and after the guillotine in that path, constrained to execute movement in synchronism, each to hold the stripped web and urge it through the guillotine when open and support the stripped web before and after the guillotine.

10. The improvement as claimed in claim 9 wherein the means after the guillotine are at least one pneumatically operated gripper acting on a leading edge of the web, the gripper being movable longitudinally of the web path in synchronism with feed rollers before the guillotine holding and urging the web through the guillotine.

References Cited

UNITED STATES PATENTS

| | | | |
|---|---|---|---|
| 1,423,798 | 7/1922 | Hennessy | 83—277 |
| 2,627,212 | 2/1953 | Connor et al. | 156—521 X |
| 3,496,811 | 2/1970 | Flanagan et al. | 83—277 X |
| 1,868,226 | 7/1932 | Draher et al. | 83—277 |
| 2,966,086 | 12/1960 | Sjostrom | 83—175 |
| 3,077,919 | 2/1963 | Krueger | 156—584 |
| 3,347,734 | 10/1967 | Covert et al. | 156—584 X |
| 3.489,040 | 6/1968 | Fritzinger | 156—584 X |

BENJAMIN A. BORCHELT, Primary Examiner

J. M. HANLEY, Assistant Examiner

U.S. Cl. X.R.

156—234, 540, 584; 83—277